(12) United States Patent
Lee et al.

(10) Patent No.: US 8,613,003 B2
(45) Date of Patent: Dec. 17, 2013

(54) DISPLAY APPARATUS AND METHOD OF CONTROLLING THE SAME

(75) Inventors: Tae-dong Lee, Yongin-si (KR); Ki-ho Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 13/053,897

(22) Filed: Mar. 22, 2011

(65) Prior Publication Data

US 2012/0054780 A1    Mar. 1, 2012

(30) Foreign Application Priority Data

Aug. 31, 2010   (KR) .................. 10-2010-0084726

(51) Int. Cl.
    *G06F 9/44*        (2006.01)
    *G06T 1/60*        (2006.01)
(52) U.S. Cl.
    USPC ........................ 719/328; 345/530; 717/100
(58) Field of Classification Search
    USPC ..................... 345/530; 717/100; 719/328
    See application file for complete search history.

(56) References Cited

U.S. PATENT DOCUMENTS

| | | | |
|---|---|---|---|
| 7,180,531 B2* | 2/2007 | Gery et al. | 345/698 |
| 2003/0236657 A1* | 12/2003 | Ryzl | 703/23 |
| 2005/0081061 A1* | 4/2005 | Acott et al. | 713/201 |
| 2006/0248506 A1* | 11/2006 | Luo et al. | 717/104 |
| 2007/0006120 A1* | 1/2007 | Proebsting et al. | 717/101 |
| 2010/0037204 A1* | 2/2010 | Lin et al. | 717/106 |
| 2010/0177076 A1* | 7/2010 | Essinger et al. | 345/207 |

* cited by examiner

*Primary Examiner* — Charles E Anya
(74) *Attorney, Agent, or Firm* — Sughrue Mion, PLLC (57) ABSTRACT

A display apparatus and a method of controlling the same are provided. The display apparatus includes: a signal processing unit which processes an image signal; a display unit which displays an image thereon corresponding to the processed image signal; a communication unit which communicates with a server which stores a plurality of application programs; and a controller which requests information about the plurality of application programs from the server, determines whether the application programs can be properly performed in the display apparatus based on the information received corresponding to the request, and controls the communication unit to receive only at least one application program that can be performed properly among the application programs. Accordingly, a display apparatus is capable of receiving only at least one application program that can be performed in the display apparatus from a server.

8 Claims, 5 Drawing Sheets

DISPLAY APPARATUS AND METHOD OF CONTROLLING THE SAME

CROSS-REFERENCE TO RELATED APPLICATION

This application claims priority from Korean Patent Application No. 10-2010-0084726, filed on Aug. 31, 2010 in the Korean Intellectual Property Office, the disclosure of which is incorporated herein by reference.

BACKGROUND

1. Field

Methods and apparatuses consistent with the exemplary embodiments relate to a display apparatus and a method of controlling the same, and more particularly, to a display apparatus which receives only application programs performed in the display apparatus among a plurality of application programs received from a server, and a method of controlling the same.

2. Description of the Related Art

A development tool, for example a software development kit (SDK), is used to create application programs performed in a software package, a software framework, a hardware platform, a computer system, a video game console, an operating system, or a similar platform. The SDK is provided for free over the Internet for the purpose of marketing or the like, and thus it may be easily used by program developers.

Recently, an application program created by the SDK is performed in a television (TV), so that various functions may be provided to a user.

However, some existing TVs may receive application programs which cannot be performed in the TV. This may cause a malfunction in the TV.

SUMMARY

Accordingly, one or more exemplary embodiments provide a display apparatus which receives only at least one application program performed in the display apparatus among a plurality of application programs received from a server, and a method of controlling the same.

The foregoing and/or other aspects may be achieved by providing a display apparatus including: a signal processing unit which processes an image signal; a display unit which displays an image thereon corresponding to the processed image signal; a communication unit which communicates with a server which stores a plurality of application programs; and a controller which requests information about the plurality of application programs from the server, determines whether the application programs can be properly performed in the display apparatus based on the information received corresponding to the request, and controls the communication unit to receive only at least one application program that can be performed properly in the display apparatus among the plurality of application programs.

The information about the application programs may include version information about a development tool of the application programs.

The display apparatus may further include a storage unit which stores firmware therein, and the controller may compare version information about the firmware with the version information about the development tool of the application programs to determine whether the application programs can be performed in the display apparatus.

The version information about the development tool of the application programs may include version information about an emulator to determine whether the application programs can be performed by the display apparatus, and the controller may compare the version information about the firmware with the version information about the emulator to determine whether the application programs can be performed by the display apparatus.

The version information about the development tool of the application programs may further include at least one among information about an application programming interface (API) used corresponding to the emulator, information about a browser performed by the application programs, and information about a flash player.

The version information about the firmware may include at least one among information about a browser included in the display apparatus, information about a flash player, and information about an API.

The foregoing and/or other aspects may be achieved by providing a method of controlling a display apparatus including: requesting information about a plurality of application programs from an external server which stores the plurality of application programs; determining whether the application programs can be properly performed in the display apparatus based on the information received corresponding to the request; and receiving only at least one application program that can be performed properly in the display apparatus among the plurality of application programs.

The information about the application programs may include version information about a development tool of the application programs.

The determining may compare version information about firmware stored in a storage unit with the version information about the development tool of the application programs to determine whether the application programs are performable.

The version information about the development tool of the application programs may include version information about an emulator to determine whether the application programs can be performed in the display apparatus, and the determining may compare the version information about the firmware with the version information about the emulator to determine whether the application programs can be performed in the display apparatus.

The version information about the development tool of the application programs may further include at least one among information about an application programming interface (API) used corresponding to the emulator, information about a browser performed by the application programs, and information about a flash player.

The version information about the firmware may include at least one among information about a browser included in the display apparatus, information about a flash player, and information about an API.

As described above, an aspect of the exemplary embodiments provides a display apparatus which receives only at least one application program that can be performed in the display apparatus from a server which stores a plurality of application programs, and a method of controlling the same.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
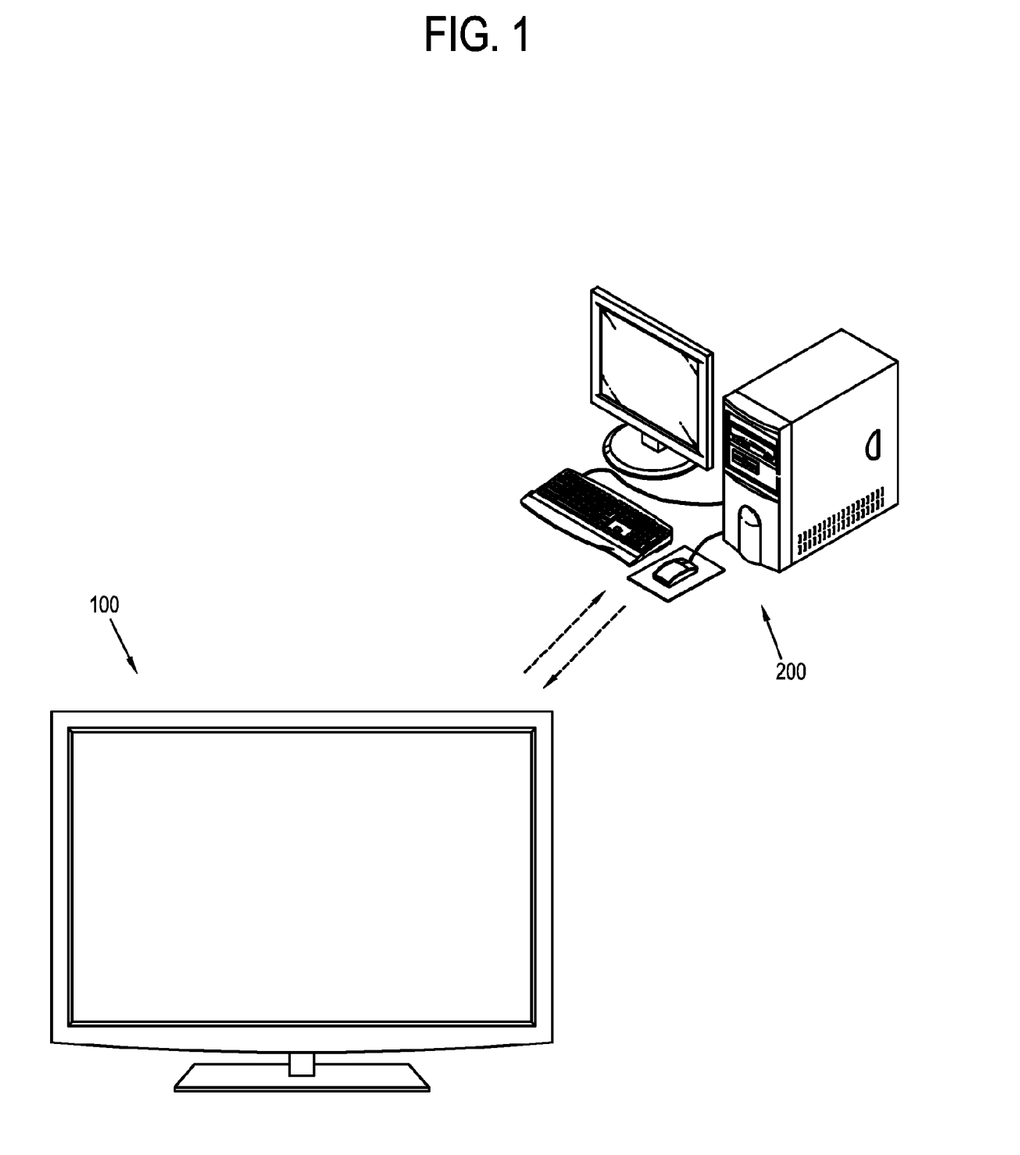
FIG. 1 is a schematic view of a display system including a display apparatus according to an exemplary embodiment.

FIG. 1 is a schematic view of a display system including a display apparatus according to an exemplary embodiment. As shown in FIG. 1, the display system includes the display apparatus 100 and a server 200. The display apparatus 100 and the server 200 are connected to each other through a communication unit, and transmit and receive various control signals and data through the communication unit. The display apparatus 100 according to the present exemplary embodiment requests information about a plurality of application programs from the server 200, requests the server 200 to transmit application programs which the display apparatus 100 is capable of implementing based on the information received in response to the request for information, and receives the application programs from the server 200.

The display apparatus 100 may be configured as a TV which implements an application program and displays the program on a display unit. When the display apparatus 100 is configured as a TV, the display apparatus 100 may include an Internet protocol television (IPTV) connected to the server 200 using an Internet protocol.

The server 200 provides various services to the display apparatus 100 in response to a request signal transmitted from the display apparatus 100. The server 200 may include a storage unit to store data used to provide a service and a communication unit to communicate with the display apparatus 100. Hereinafter, the display apparatus 100 and the server 200 will be further described with reference to FIG. 2 illustrating a block diagram of the display apparatus 100 and the server 200.

Figure 2:
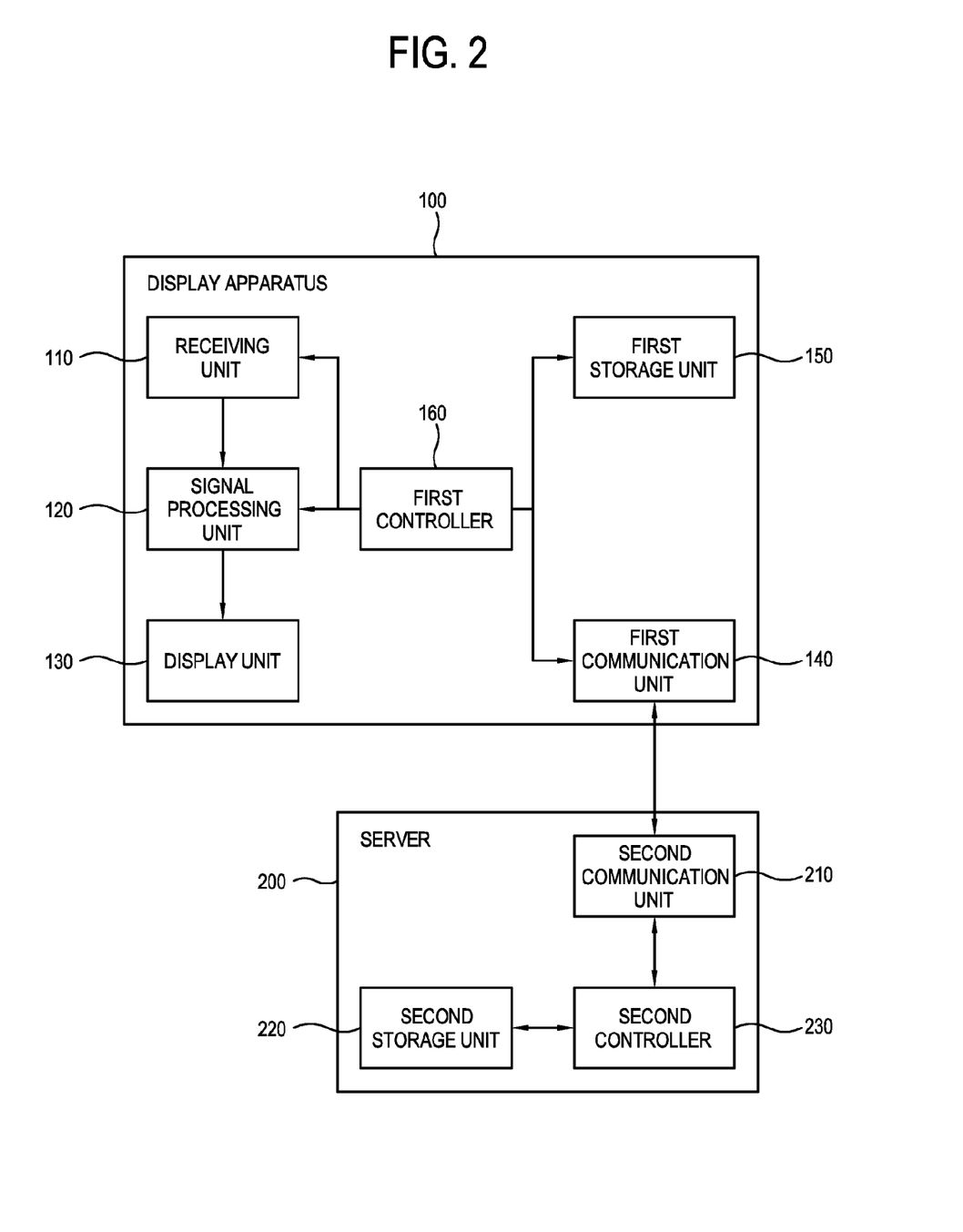
FIG. 2 is a block diagram of a display apparatus according to an exemplary embodiment.

As shown in FIG. 2, the display apparatus 100 includes a receiving unit 110, a signal processing unit 120, a display unit 130, a first communication unit 140, a first storage unit 150, and a first controller 160 to control the above components, and the server 200 includes a second communication unit 210 to communicate with the first communication unit 140, a second storage unit 220, and a second controller 230.

The receiving unit 110 receives an image signal from an external image source (not shown). The display apparatus 100 may receive an image signal from various image sources, such as but not limited to, a computer (not shown) including a CPU (not shown) and a graphic card (not shown) to generate and provide an image signal locally, a server (not shown) to provide an image signal via a network, a transmitting device of a broadcasting station (not shown) to transmit a broadcasting signal using public or cable networks. Thus, the receiving unit 110 receives an image signal from an outside source and transmits the image signal to the signal processing unit 120, and may be configured in various types corresponding to a standard of a received image signal and a form of the display apparatus 100.

For example, when the display apparatus 100 is a TV, the receiving unit 110 receives a radio frequency (RF) signal transmitted from a broadcast transmitting device wirelessly or image signals in composite video, component video, super video, Syndicat francais des Constructeurs d'Appareils Radio et Television (SCART), and high definition multimedia interface (HDMI) standards through a cable. Here, the receiving unit 110 includes an antenna (not shown) and/or a tuner (not shown) to tune a broadcast channel.

The signal processing unit 120 processes an image signal received through the receiving unit 110 to display an image corresponding to the processed image signal on the display unit 130.

The signal processing unit 120 performs various types of preset image processing on an image signal. For example, the signal processing unit 120 may conduct decoding and encoding corresponding to various image formats, de-interlacing, frame refresh rate conversion, scaling, noise reduction to improve image quality, detail enhancement, and line scanning. However, the image processing is not limited thereto. The signal processing unit 120 may conduct the above respective image processings solely or in a combination thereof.

The signal processing unit 120 processes an image signal into a plurality of horizontal scan lines for each frame and scans the lines on the display unit 130. The signal processing unit 120 scans an image from an upper side to a lower side of a display region of the display unit 130. When scanning for one frame is completed, the signal processing unit 120 scans an image for a subsequent frame after a preset period of non-scanning time.

The signal processing unit 120 may process an audio signal received through the receiving unit 110 along with the image signal. Thus, the signal processing unit 120 performs various types of preset audio processing on the audio signal. A type of audio processing may include converting an analog audio signal to a digital signal, amplifying an audio signal, adjusting an output level of an audio signal, correcting a frequency of an audio signal, and the like. However, the audio processing is not limited thereto. The above respective processings may be performed solely or in a combination thereof. Further, the signal processing unit 120 may generate a predetermined audio signal. Thus, the display apparatus 100 of the present exemplary embodiment may further include a speaker (not shown) to output a sound corresponding to an audio signal processed by the signal processing unit 120, wherein the speaker may include a woofer speaker.

The display unit 130 displays an image corresponding to an image signal processed by the signal processing unit 120. The display unit 130 may display one image frame by vertically arranging a plurality of horizontal scan lines scanned by the signal processing unit 120. The display unit 130 includes a display panel (not shown) to display the image, and the display panel may include a liquid crystal display (LCD) panel including a liquid crystal layer, an organic light emitting diode (OLED) panel including a light emitting layer of organic compounds, and a plasma display panel (PDP), but is not limited thereto. Further, the display unit 130 may further include a panel driver (not shown) to drive the display panel.

The first communication unit 140 communicates with the second communication unit 210 of the server 200, transmits a request signal for information about a plurality of application programs to the server 200 by control of the first controller 160, and receives a response signal and an application program from the server 200.

The first storage unit 150 stores firmware of the display apparatus 100. The firmware includes at least one of information about a browser, information about a flash player, and information about an application programming interface (API) included in the display apparatus 100. Accordingly, a version of the browser, whether the flash player exists, a version of the flash player, and an allowable range of the API in the display apparatus 100 may be changed based on a version of the firmware.

The first controller 160 controls the first communication unit 140 to transmit a request signal requesting information about a plurality of application programs to the server 200 and determines whether the plurality of application programs may be properly implemented in the display apparatus 100 based on the information received in response to the request. According to the determination result, the first controller 160 controls the first communication unit 140 to receive only at least one application program among the plurality of application programs which may perform properly in the display apparatus.

The server 200 includes the second communication unit 210, the second storage unit 220, and the second controller 230 to control the above components.

When the server 200 is requested to transmit information about a plurality of application programs from the first communication unit 140 through the second communication unit 210, the second controller 230 controls the second communication unit 210 to transmit the requested information about the plurality of application programs stored in the second storage unit 220 to the first communication unit 140. When the server 200 is requested to transmit a particular application program from the first communication unit 140, the second controller 230 controls the second communication unit 210 to transmit the particular application program stored in the second storage unit 220.

The second storage unit 220 of the server 200 stores a plurality of application programs and information about the application programs. The information about the application programs includes version information about development tools used to create the respective application programs.

The application programs include application software implemented in a software package, a software framework, a hardware platform, a computer system, a video game console, an operating system, and a similar platform, but is not limited thereto. Thus, the application programs may be computer software designed to assist a user in implementing a single or a plurality of projects, including enterprise software, accounting software, graphic software, multimedia players, and the like.

The application programs may be created using a development tool, for example a software development kit (SDK). The SDK may include a text editor to create an application program, a video editor, an emulator to determine whether an application program created using the SDK may be implemented, and the like. When an application program is created in the SDK, the API is used. The API determines quality of an application program and a range of a service. The API may have an allowable range changing based on a version of the SDK or a version of an emulator. Thus, an allowable API is preset corresponding to a version of the SDK or a version of the emulator, and only an application program created using the preset API may be examined in the emulator of the version for whether the program is implemented.

Accordingly, the version information about the development tools may include version information about the emulator to determine whether the application program is implemented. The version information about the emulator may include information about an available API corresponding to the version of the emulator as a range of the API in which the emulator having the version is used is bound. Further, the version information about the development tools may include at least one of information about a browser performed by the application programs and information about a flash player implemented by the application programs.

Hereinafter, a control operation of the first controller 160 of the display apparatus according to the present exemplary embodiment will be further described with reference to FIGS. 3A and 3B.

Figure 3A:
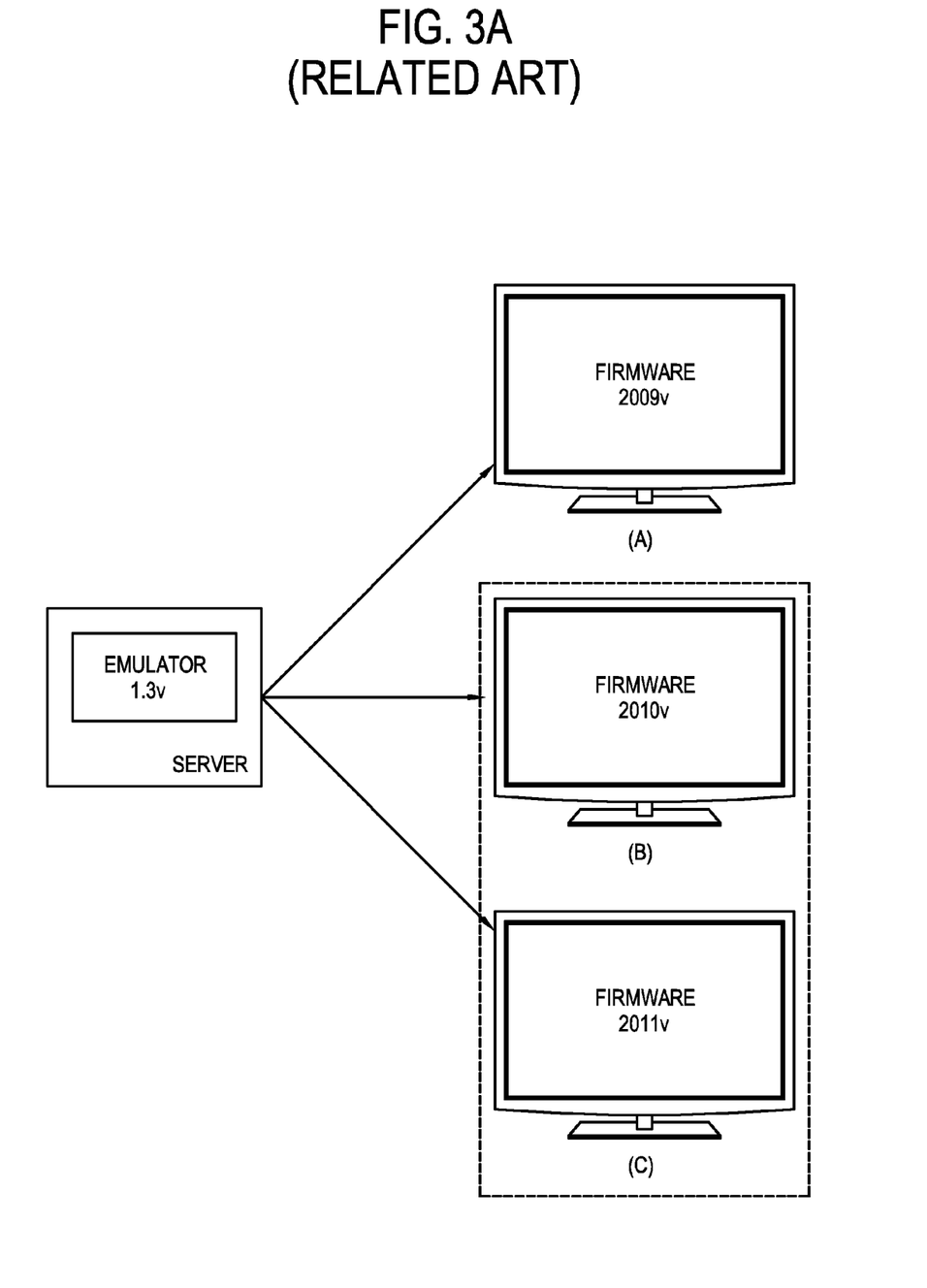
FIG. 3A shows transmission of an application program of a display apparatus according to a related art.

FIG. 3A shows transmission of an application program of a display apparatus according to a related art.

As shown in FIG. 3A, an application program created using an allowable API corresponding to a 1.3 version of an emulator (hereinafter, also referred to as "an emulator 1.3v") is stored in a server. Display apparatuses A, B, and C according to the related art respectively store a 2009 version of firmware (hereinafter, also referred to as a "firmware 2009v"), a 2010 version of firmware (hereinafter, also referred to as a "firmware 2010v"), and a 2011 version of firmware (hereinafter, also referred to as a "firmware 2011v"). Here, the application program created using the allowable API corresponding to the emulator 1.3v may be properly performed only in the display apparatuses B and C which respectively store the firmware 2010v and the firmware 2011v.

However, the display apparatuses A, B, and C according to the related art download all application programs stored in the server without determining whether the application programs may be implemented properly in the display apparatuses A, B, and C. Thus, although the display apparatus A receives and starts to implement an application program which is not implemented, the application program is not properly performed, and causes a malfunction of the display apparatus A.

As a version of an SDK becomes diverse, a version of an emulator also becomes diverse, and an increased number of application programs are created by a large number of users or application developers using a variety of SDKs. Accordingly, as described above, transmission and implementation of a great number of application programs which may not implemented in corresponding display apparatuses cause malfunction of the display apparatuses, increasing users' inconvenience.

Figure 3B:
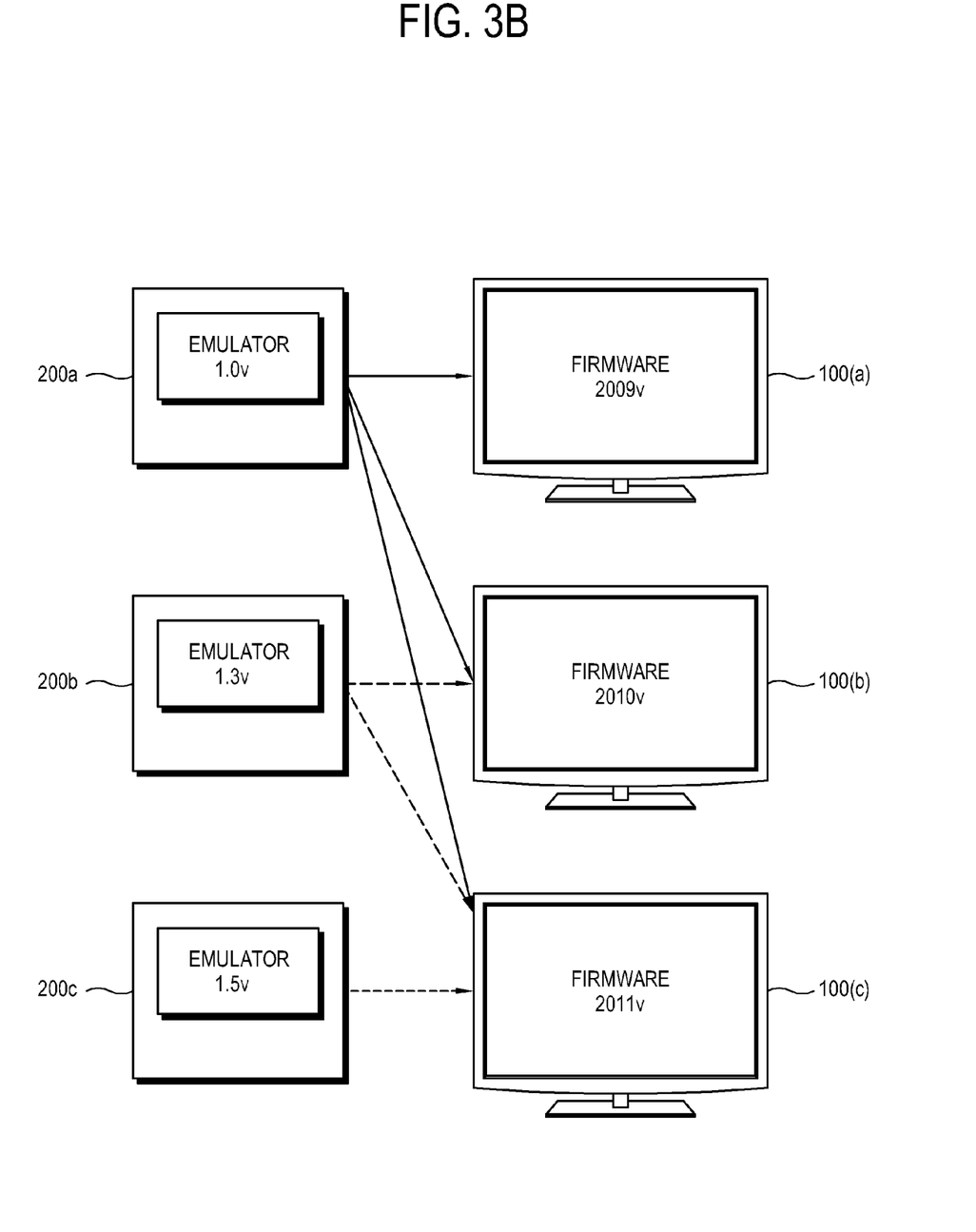
FIG. 3B shows transmission of an application program of a display apparatus according to an exemplary embodiment.

FIG. 3B shows transmission of an application program of a display apparatus according to an exemplary embodiment.

Display apparatuses 100a, 100b, and 100c according to the present exemplary embodiment may request, to a server, transmission of only at least one application program that can be performed properly in the display apparatuses among a plurality of application programs and receive the application program, the application programs being created by various versions of an SDK and examined by various versions of an emulator for whether the programs are performed. Accordingly, the present exemplary embodiment may solve problems of the related art mentioned with reference to FIG. 3A.

A server 200a stores a plurality of application programs created using an allowable API corresponding to an emulator 1.0v, a server 200b stores a plurality of application programs created using an allowable API corresponding to an emulator 1.3v, and a server 200c stores a plurality of application programs created using an allowable API corresponding to an emulator 1.5v. The servers 200a, 200b, and 200c respectively store the application programs together with information about the application programs. The information about the application programs includes version information about a development tool of the programs, and the version information about the development tool includes at least one among version information about an emulator, information about an allowable API corresponding to a version of the emulator, version information about a browser performed by the application programs, and whether a flash player exists and version information about the flash player. The information about the application programs may be generated as a metadata in an XML format and be stored with the application programs in a ZIP file.

The display apparatuses 100a, 100b, and 100c respectively store a firmware 2009v, a firmware 2010v, and a firmware 2011v. The firmware includes at least one of information about a browser included in the display apparatuses, information about a flash player, and information about an API. Thus, a version of a browser, whether a flash player exists and a version of the flash player, a range of an allowable API, and the like are different depending on a version of the firmware. Further, the firmware may store version information about an emulator stipulating an allowable range of an API to create an application program performed in a corresponding display apparatus corresponding to a version of the firmware. For example, when the firmware 2009v performs an application program created using an allowable API corresponding to the emulator 1.0v or lower versions, the firmware 2009v includes information about the emulator 1.0v and the lower versions. Similarly, the firmware 2010v includes information about the emulator 1.3v and lower versions, and the firmware 2011v includes information about the emulator 1.5v and lower versions.

The plurality of applications programs created using the allowable API corresponding to the emulator 1.0v and stored in the server 200a may be performed properly in a display apparatus having the firmware 2009v or upper versions.

The plurality of applications programs created using the allowable API corresponding to the emulator 1.3v and stored in the server 200b may be performed properly in a display apparatus having the firmware 2010v or upper versions.

The plurality of applications programs created using the allowable API corresponding to the emulator 1.5v and stored in the server 200c may be performed properly in a display apparatus having the firmware 2011v or upper versions.

The display apparatuses 100a, 100b, and 100c respectively request transmission of the information about the application programs from the servers 200a, 200b, and 200c. The servers 200a, 200b, and 200c respectively transmit the information about the application programs to the display apparatuses 100a, 100b, and 100c in response to the request. The information about the application programs includes the version information about the development tool of the programs. The version information about the development tool includes the version information about the emulator.

A controller of each of the display apparatuses 100a, 100b, and 100c determines whether the application programs may be performed in the display apparatus 100a, 100b, and 100c based on the received information about the application programs.

That is, the controller compares a firmware version of the display apparatuses with a version of the development tool of the application programs, particularly an emulator version, to determine whether the application programs may be performed properly in the corresponding display apparatuses.

A controller of the display apparatus 100a compares the firmware 2009v with the emulator 1.0v, the emulator 1.3v, and the emulator 1.5v among the information about the application programs received from the servers 200a, 200b, and 200c. The display apparatus 100a including the firmware 2009v may properly perform only an application program created using the allowable API corresponding to the emulator 1.0v. Thus, the controller of the display apparatus 100a controls a communication unit to request transmission of the application program and to receive the application program from the server 200a storing the application program created using the allowable API corresponding to the emulator 1.0v.

Likewise, a controller of the display apparatus 100b compares the firmware 2010v with the emulator 1.0v, the emulator 1.3v, and the emulator 1.5v among the information about the application programs received from the servers 200a, 200b, and 200c. The display apparatus 100b including the firmware 2010v may properly perform only application programs respectively created using the allowable API corresponding to the emulator 1.0v and the allowable API corresponding to the emulator 1.3v. Thus, the controller of the display apparatus 100b controls a communication unit to request transmission of the application programs and to receive the application programs from the servers 200a and 200b respectively storing the application programs created using the allowable API corresponding to the emulator 1.0v and the allowable API corresponding to the emulator 1.3v.

Similarly, a controller of the display apparatus 100c compares the firmware 2011v with the emulator 1.0v, the emulator 1.3v, and the emulator 1.5v among the information about the application programs received from the servers 200a, 200b, and 200c. The display apparatus 100c including the firmware 2011v may properly perform only application programs respectively created using the allowable API corresponding to the emulator 1.0v, the allowable API corresponding to the emulator 1.3v, and the allowable API corresponding to the emulator 1.5v. Thus, the controller of the display apparatus 100c controls a communication unit to request transmission of the application programs and to receive the application programs from the servers 200a, 200b, and 200c respectively storing the application programs created using the allowable API corresponding to the emulator 1.0v, the allowable API corresponding to the emulator 1.3v, and the allowable API corresponding to the emulator 1.5v.

The above exemplary embodiment illustrates that the display apparatuses determine whether the application programs can be properly performed in the display apparatuses using the version information about the emulator among the information about the application programs, but the display apparatuses may use the information about the browser included in the version information about the firmware, the information about the flash player, and the information about the API. The information about the application programs may include the information about the browser to properly perform the application programs, the information about the flash player, and the information about the APIs used to create the application programs, and thus the controllers may determine whether the application programs are performed in the display apparatuses using the above information.

The display apparatuses 100a, 100b, and 100c according to the present exemplary embodiment may request and receive the information about the application programs from the servers, may determine whether the application programs can be properly performed in the display apparatuses, and may request transmission of only application programs that can be properly performed in the display apparatus and receive the application programs that can be properly performed in the display apparatus. Thus, malfunction of the display apparatuses due to unconditional transmission of the application programs is prevented.

Figure 4:
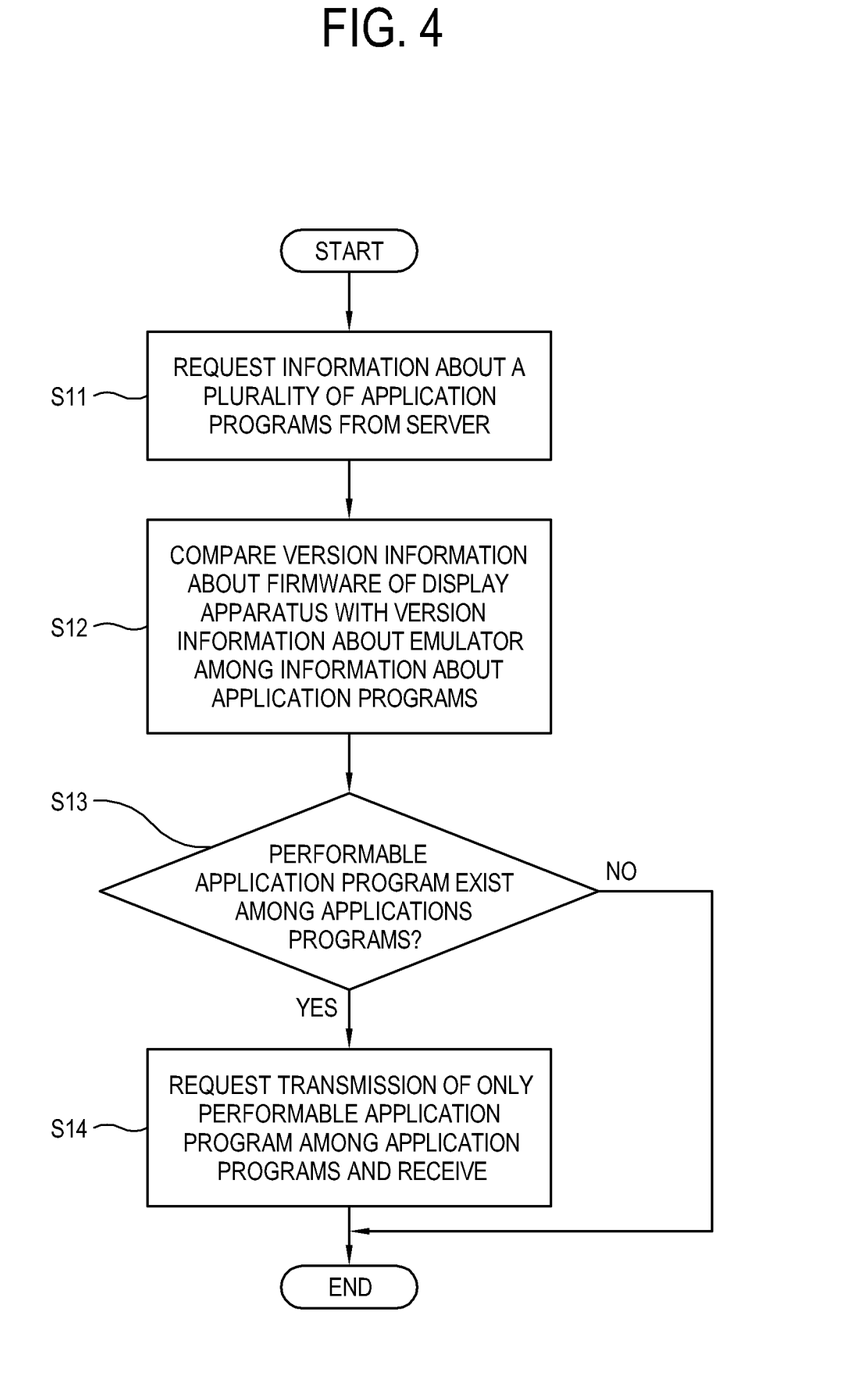
FIG. 4 is a flowchart illustrating a control operation of a display apparatus according to an exemplary embodiment.

FIG. 4 is a flowchart illustrating a control operation of a display apparatus according to an exemplary embodiment.

As shown in FIG. 4, the display apparatus 100 requests transmission of information about a plurality of application programs from the server 200 through the communication unit 140 (operation S11).

When the information about the application programs is received from the server 200 corresponding to the request, the controller 160 of the display apparatus 100 compares version information about an emulator with version information about firmware among the received information (operation S12). As a result, when it is determined that an application program that can be properly performed in the display apparatus 100 exists among the application programs (operation S13), the display apparatus 100 transmits a signal requesting transmission of only the corresponding application program to the server 200 through the communication unit 140, and receives the application program (operation S14).

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
   a signal processing unit which processes an image signal;
   a display unit which displays an image thereon corresponding to the processed image signal;
   a communication unit which communicates with a server which stores a plurality of application programs;
   a controller which requests information about the plurality of application programs from the server, determines whether the application programs can be properly performed in the display apparatus based on information received corresponding to the request, and controls the communication unit to receive only at least one application program, among the plurality of application programs, that can be properly performed in the display apparatus, and
   a storage unit which stores firmware therein,
   wherein the information about the application programs comprises version information about a development tool of the application programs, and
   wherein the controller compares version information about the firmware with the version information about the development tool of the application programs to determine whether the application programs can be performed in the display apparatus.

2. The display apparatus of claim 1, wherein the version information about the development tool of the application programs comprises version information about an emulator to determine whether the application programs can be performed in the display apparatus, and the controller compares the version information about the firmware with the version information about the emulator to determine whether the application programs can be performed in the display apparatus.

3. The display apparatus of claim 2, wherein the version information about the development tool of the application programs further comprises at least one among information about an application programming interface (API) used corresponding to the emulator, information about a browser performed by the application programs, and information about a flash player.

4. The display apparatus of claim 2, wherein the version information about the firmware comprises at least one among information about a browser included in the display apparatus, information about a flash player, and information about an application programming interface (API).

5. A method of controlling a display apparatus comprising:
   requesting information about a plurality of application programs from an external server storing the plurality of application programs;
   determining whether the application programs can be properly performed in the display apparatus based on information received corresponding to the request; and
   receiving only at least one application program among the plurality of application programs that can be properly performed in the display apparatus,
   wherein the information about the application programs comprises version information about a development tool of the application programs, and
   wherein the determining compares version information about firmware stored in a storage unit with the version information about the development tool of the application programs to determine whether the application programs can be performed in the display apparatus.

6. The method of claim 5, wherein the version information about the development tool of the application programs comprises version information about an emulator to determine whether the application programs can be performed, and the determining compares the version information about the firmware with the version information about the emulator to determine whether the application programs can be performed in the display apparatus.

7. The method of claim 6, wherein the version information about the development tool of the application programs further comprises at least one among information about an application programming interface (API) used corresponding to the emulator, information about a browser performed by the application programs, and information about a flash player.

8. The method of claim 6, wherein the version information about the firmware comprises at least one among information about a browser included in the display apparatus, information about a flash player, and information about an application programming interface (API).

* * * * *